April 21, 1931.  F. E. ASELTINE  1,801,586
CENTRIFUGAL CLUTCH
Filed July 3, 1928
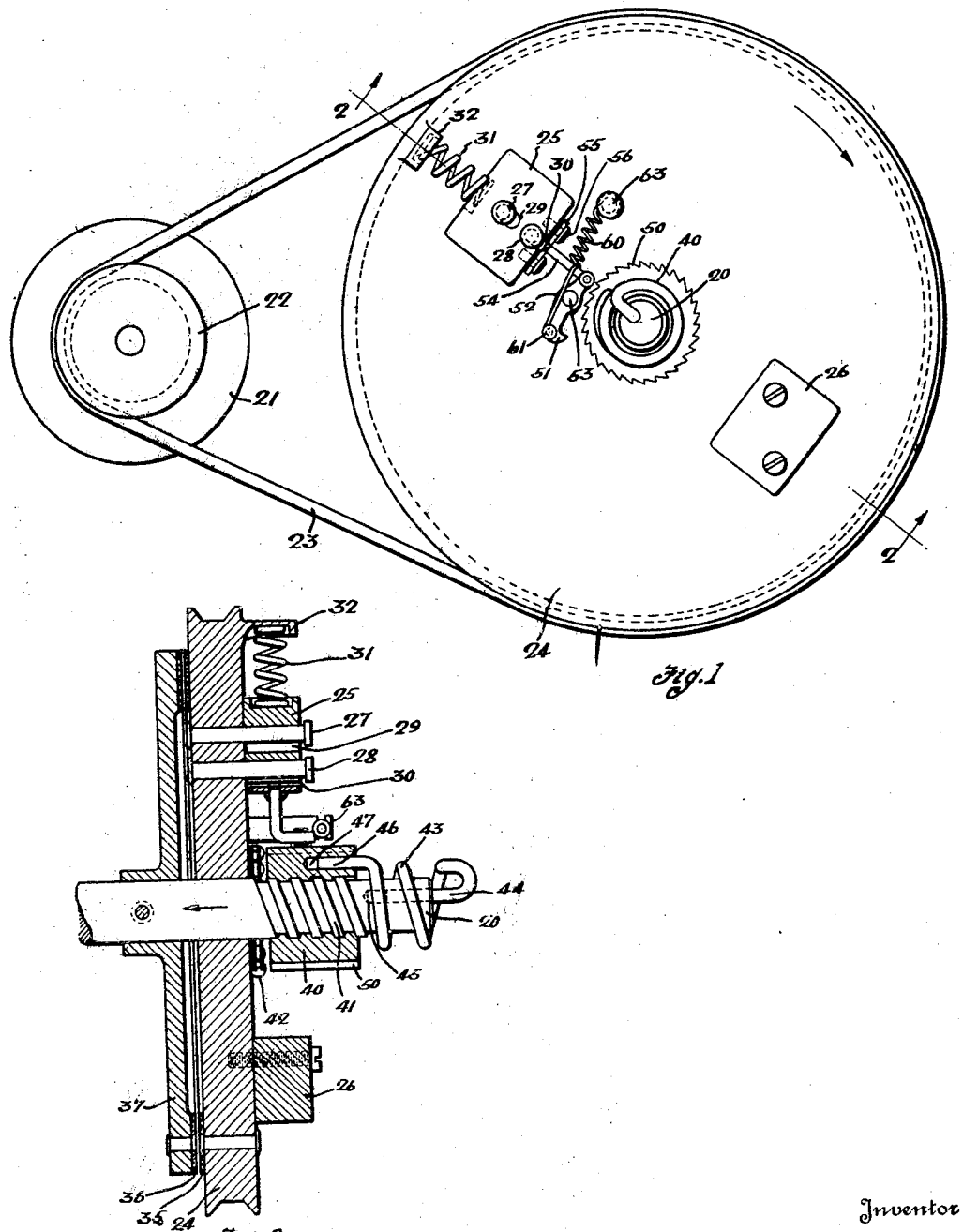
Inventor
Fred E. Aseltine
By Spencer Hardman & Fehr
his Attorneys Patented Apr. 21, 1931

1,801,586

UNITED STATES PATENT OFFICE

FRED E. ASELTINE, OF DAYTON, OHIO, ASSIGNOR, BY MESNE ASSIGNMENTS, TO DELCO PRODUCTS CORPORATION, OF DAYTON, OHIO, A CORPORATION OF DELAWARE

CENTRIFUGAL CLUTCH

Application filed July 3, 1928. Serial No. 290,146.

This invention relates to centrifugal or speed responsive clutches for automatically connecting a power operated rotatable driving member with a rotatable member to be driven.

The present invention includes among its objects the provision of a centrifugal clutch which is rugged and durable and reliable in operation and which may be produced at relatively low cost.

Further objects and advantages of the present invention will be apparent from the following description, reference being had to the accompanying drawings, wherein a preferred form of the present invention is clearly shown.

In the drawings:

Fig. 1 is a side elevation of driving mechanism including a clutch embodying the present invention.

Fig. 2 is a sectional view on the line 2—2 of Fig. 1.

Referring to the drawings, 20 designates the rotatable member or shaft to be driven and 21 indicates an electric motor or other power device for driving the shaft 20. The motor 21 operates a pulley 22 connected by a belt 23 with a pulley 24 loosely rotatable upon the shaft 20 and adapted to be drivingly connected therewith by the speed responsive clutch to be described.

The pulley 24 supports a radially movable weight 25 and a fixed counterweight 26. In order to support the weight 25 for radial sliding movement, the pulley 24 is provided with guide pins or studs 27 and 28 which are received respectively by slot 29 and notch 30 provided by the weight 25. A spring 31 included between a lug 32 and the weight 25 yieldingly urges the weight 25 toward the shaft 20. The pulley 24 carries a clutch ring 35 adapted to frictionally engage a similar clutch ring 36 carried by a disk 37 drivingly connected with the shaft 20. The rings 35 and 36 are made of any suitable friction material. In order to effect engagement between the rings 35 and 36, the pulley 24 must be moved axially toward the left as viewed in Fig. 2. This axial movement is produced by causing a nut 40, cooperating with screw threads 41 provided by the shaft 20, to be threaded along the shaft toward the left as viewed in Fig. 2, in order to engage an anti-friction thrust bearing 42 which in turn will transmit axial movement toward the left to the pulley 24 in order to effect the engagement of the clutch rings 35 and 36. Normally the nut 40 is disconnected from the pulley 24 and is maintained normally in the position shown in Fig. 2 by a helical coil spring 43 having one end 44 received by hole 45 provided eccentrically in an end portion of the shaft 20, and having the other end portion 46 received by hole 47 provided eccentrically in the nut 40. The spring end 46 does not fit tightly in the hole 47 but is slidingly connected with the nut so that the nut 40 may move axially relative to the shaft 20.

The relative axial movement of the nut 40 is controlled centrifugally by causing it to be connected with the pulley after the pulley has reached a predetermined speed. Referring particularly to Fig. 1 it will be noted that the nut 40 is provided with a toothed periphery 50, any tooth of which is adapted to receive the hook-end 51 of a lever 52 which is pivoted upon a pin 53 attached to the pulley 24. The lever 52 is connected by a link 54 with a cross bar 55 loosely supported on screws or pins 56 attached to the weight 25. Normally the hook-end 51 of the lever 52 is held out of engagement with the teeth 50 of the nut 40 by a spring 60 having one end attached to a stud 61 attached to the lever 52 and having the other end attached to a stud 63 carried by the pulley 24. As seen in Fig. 1, the center line of action of the spring 60 is located on the left hand side of the lever fulcrum 53 so as to urge the lever 52 clockwise and to assist the spring 31 in maintaining the weight 25 in normal position.

As the speed of the pulley increases, the weight 25 will move radially away from the shaft 20 due to centrifugal force acting in opposition to forces produced by springs 31 and 60. As the weight 25 moves outwardly, the lever 52 will move counterclockwise thus moving the stud 61 toward the shaft 20. After a predetermined speed has been reached, causing the weight 25 to move outwardly such a distance as to cause the center line of the spring 60 to be located to the right of the axis of the fulcrum stud 53, then the spring 60 will operate differentially instead of cumulatively with respect to the spring 31, and will assist centrifugal force in causing the hook-end 51 of lever 52 to engage one of the teeth 50 of the nut 40. Since the cross bar 55 is loosely supported on the weight 25, the hook-end 51 engages the teeth 50 with a snap action as soon as the center line of the spring 60 is to the right of the fulcrum as viewed in Fig. 1. As the pulley 24 continues to rotate it will cause the nut 40 to rotate and be threaded toward the left along the shaft 20 so as to cause the pulley 24 to move toward the left and the clutch rings 35 and 36 to be engaged. In this way the motor 21 is drivingly connected with the shaft 20 after a certain speed of the pulley 24 has been obtained. Obviously when the speed of the pulley 24 falls below a certain amount, the spring 31 will be effective to move the weight 25 to such an extent that the lever 52 will be disconnected from the nut 40. When the lever 52 is disconnected from the nut 40, the spring 43 rotates the nut 40 relative to the shaft 20 so as to cause the nut 40 to be threaded toward the right as viewed in Fig. 2, allowing the pulley 24 to move to the right also thereby disengaging the clutch plates 35 and 36.

The arrangement of the spring 60 relative to the lever 52 provides for a relatively quick movement of engagement of the hook-end 51 with the nut 40 and a relatively quick movement of disengagement. Thus the clutch has a positive action both as to engagement and release. The construction referred to also provides a relatively wide difference in speed between the speed of clutch engagement and the speed of clutch disengagement. Thus a substantial variation in speed of the pulley 24 is permitted.

The construction shown is operative where the pulley is intended to rotate in a clockwise direction as viewed in Fig. 1. If the pulley 24 is required to rotate counterclockwise, then the screw threads 41 must be left hand screw threads and the nut 40, lever 52, and spring 60 must be reversed with respect to the center line of radial movement of the weight 25.

One of the many uses for a centrifugal clutch of this type is in connection with the drive for a gas compressor or similar device having variable torque characteristics. The pulley 24 may have considerable mass so as to operate as a flywheel for the shaft 20 and parts driven thereby. The motor 21 may be one having relatively low torque starting characteristics since it starts under only a fraction of full load requirements. By the time the pulley 24 has attained a speed which will effect engagement of the clutch the pulley will have acquired sufficient momentum to easily effect the starting of the power driven device into motion. Thus a relatively small horse power motor may be used to drive the gas compressor.

While the form of embodiment of the present invention as herein disclosed, constitutes a preferred form, it is to be understood that other forms might be adopted, all coming within the scope of the claims which follow.

What is claimed is as follows:—

1. A centrifugal clutch comprising, in combination, coaxially rotatable driving and driven members, one having axial movement relative to the other; nut-and-screw provisions connected with the driven member for frictionally engaging the members by threading one part relative to the other; and a speed responsive device connected with the driving member for connecting one part of the nut-and-screw provisions with the driving member in order to effect relative movement between the nut and screw and to cause the clutch members to be engaged.

2. A centrifugal clutch comprising, in combination, coaxially rotatable driving and driven members, one having axial movement relative to the other; nut-and-screw provisions connected with the driven member for frictionally engaging the members by threading one part relative to the other; a speed responsive device connected with the driving member for connecting the nut member with the driving member in order to effect relative movement between the nut and screw and to cause the clutch members to be engaged.

3. A centrifugal clutch comprising, in combination, coaxially rotatable driving and driven members, one having axial movement relative to the other; nut-and-screw provisions connected with the driven member for frictionally engaging the members by threading one part relative to the other; and a speed responsive device including a radially movable weight carried by the driving member, and means actuated thereby for connecting one part of the nut-and-screw provisions with the driving member in order to effect relative movment between the nut and screw and to cause the clutch members to be engaged.

4. A centrifugal clutch comprising, in combination, coaxially rotatable driving and driven members, one having axial movement relative to the other; nut-and-screw provisions connected with the driven member for frictionally engaging the members by threading one part relative to the other; and a speed responsive device including a radially movable weight carried by the driving member, and means actuated thereby for connecting the nut member with the driving member in order to effect relative movement between the nut and screw and to cause the clutch members to be engaged.

5. A centrifugal clutch comprising, in combination, coaxially rotatable driving and driven members, one having axial movement relative to the other; nut-and-screw provisions connected with the driven member for frictionally engaging the members by threading one part relative to the other, said nut-and-screw provisions being provided with teeth; and a speed-responsive device including a movable member carried by the driving member having a hooked-end for engaging said teeth in order to connect said part with the driving member in order to effect relative movement between the nut and screw and to cause the clutch members to be engaged.

6. A centrifugal clutch comprising, in combination, coaxially rotatable driving and driven members, one having axial movement relative to the other; nut-and-screw provisions connected with the driven member for frictionally engaging the members by threading one part relative to the other, said nut-and-screw provisions being provided with teeth; and a speed responsive device including a movable member carried by the driving member having a hooked-end for engaging said teeth in order to connect the nut member with the driving member in order to effect relative movement between the nut and screw and to cause the clutch members to be engaged.

7. A centrifugal clutch comprising, in combination, coaxially rotatable driving and driven members, one having axial movement relative to the other; nut-and-screw provisons connected with the driven member for frictionally engaging the members by threading one part relative to the other; a speed responsive device connected with the driving member for connecting one part of the nut-and-screw provisions with the driving member when the speed of the driving member has attained a certain high value, in order to engage the clutch, and operable to disconnect said part from the driving member only after the speed of the driving member has diminished to a speed substantially lower than the clutch engaging speed.

8. A centrifugal clutch according to claim 7 in which the speed responsive means includes a movable device connected with the clutch driving member and movable into and out of driving connection with a part of the screw-and-nut provisions, and includes a spring locatable so as either to urge the movable device into engagement with said part of the screw-and-nut provisions or to urge the device out of engagement with said part, and includes a weight controlling said spring.

In testimony whereof I hereto affix my signature.

FRED E. ASELTINE.